United States Patent

Kim et al.

[11] Patent Number: 6,142,020
[45] Date of Patent: Nov. 7, 2000

[54] PRESSURE AND TEMPERATURE SENSOR ASSEMBLY FOR INTERNAL COMBUSTION ENGINES

[75] Inventors: Joo-Young Kim, Kyunggi-do; Hyun-Ju Park, Inchun-si; Sang-Jo Lee, Kyunggi-do; Tae-Wook Park, Kyunggi-do; Dae-Hyun Yu, Kyunggi-do, all of Rep. of Korea

[73] Assignee: Kefico Corporation, Kyunggi-Do, Rep. of Korea

[21] Appl. No.: 09/101,163
[22] PCT Filed: Oct. 30, 1997
[86] PCT No.: PCT/KR97/00208
   § 371 Date: Jul. 2, 1998
   § 102(e) Date: Jul. 2, 1998
[87] PCT Pub. No.: WO98/20249
   PCT Pub. Date: May 14, 1998

[30] Foreign Application Priority Data

Nov. 5, 1996 [KR] Rep. of Korea .................. 96-38409

[51] Int. Cl.⁷ .................................................. G01M 15/00
[52] U.S. Cl. ................ 73/714; 73/117.3; 73/756
[58] Field of Search ................... 73/116, 117.2, 73/117.3, 431, 714, 756

[56] References Cited

U.S. PATENT DOCUMENTS 4,630,028  12/1986  Kelly et al. ............................. 73/714
5,756,899   5/1998  Ugai et al. ............................. 73/714
5,834,638  11/1998  Taylor et al. ........................... 73/714

Primary Examiner—Eric S. McCall
Attorney, Agent, or Firm—Browdy and Neimark

[57] ABSTRACT

A pressure and temperature sensor assembly for internal combustion engines is disclosed. The sensor assembly is formed by integrating a temperature sensor part with a conventional MAP sensor into a single structure. In the temperature sensor part, a temperature sensing rod (23) is formed by partially extending downward the bottom case (7) of a MAP sensor at a portion around the lower end of a pressure inlet port (9) of the bottom case (7). A temperature sensor chip (24) is interiorly installed in the temperature sensing rod (23) and is electrically connected to the connection terminals of the top case (1). The sensor assembly is commonly used for sensing both the internal pressure and inlet air temperature of a cylinder.

3 Claims, 1 Drawing Sheet

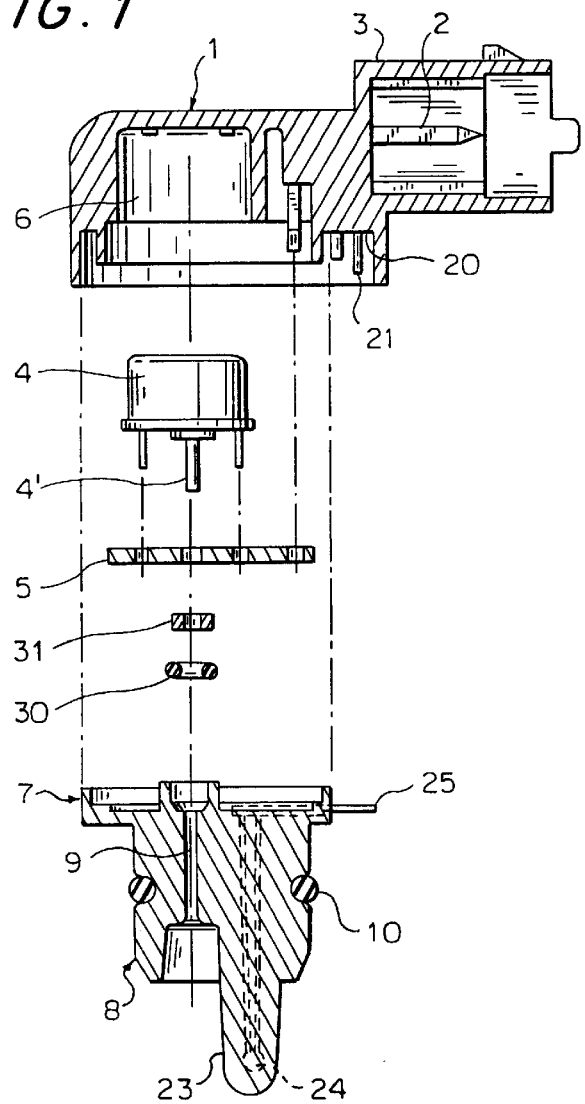
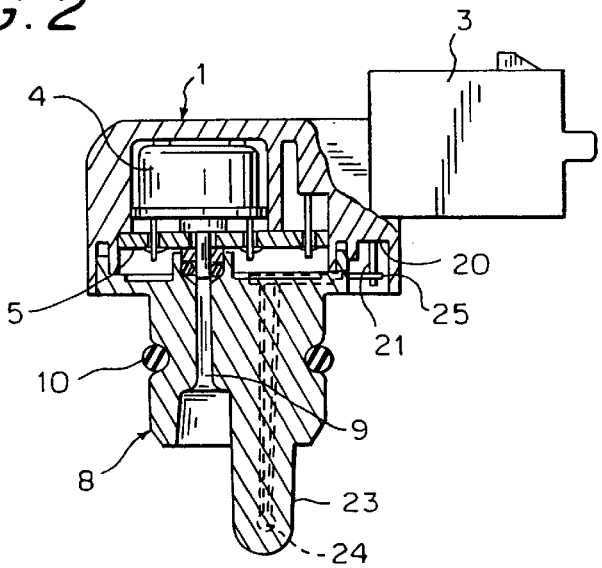

PRESSURE AND TEMPERATURE SENSOR ASSEMBLY FOR INTERNAL COMBUSTION ENGINES

TECHNICAL FIELD

The present invention relates, in general, to pressure and temperature sensors for internal combustion engines and, more particularly, to a pressure and temperature sensor assembly commonly used as a conventional MAP sensor installed in a surge tank of an engine and used for sensing the internal pressure of a cylinder prior to auxiliarily controlling suction timing of mixed gas into the cylinder and as a temperature sensor used for sensing the temperature of filtered inlet air of the cylinder prior to allowing an ECU for the engine to calculate an appropriate amount of air for the engine in accordance with a density variation of air caused by variable temperature.

BACKGROUND ART

As well known to those skilled in the art, an internal combustion engine for automobiles is typically and separately provided with two types of sensors, that is, a MAP (manifold absolute pressure) sensor and a temperature sensor. The MAP sensor is used for auxiliarily controlling suction timing of mixed gas into a cylinder by sensing the internal pressure of a surge tank and outputting a pressure signal to an ECU (electronic control unit) for the engine. Meanwhile, the temperature sensor is used for sensing the temperature of inlet air, which is sucked into the cylinder through an air cleaner, prior to outputting a temperature signal to the ECU. The temperature sensor thus allows the ECU to effectively calculate an appropriate amount of air for the engine in accordance with a density variation of air caused by the variable temperature. The MAP sensor is installed in a surge tank of an engine, while the temperature sensor is installed in an intake tube. However, the two sensors are designed to perform different functions and are separately mounted to their positions in an engine, thus having the following problems.

1. The conventional MAP and temperature sensors are separately positioned in an engine, thus complicating the construction of the engine and consuming labor and time and reducing work efficiency while being installed in the engine.

2. The temperature sensor, which is installed in the intake tube of the engine, is regrettably exposed to impurities such as moisture, dust and powdered rock in the inlet air and so such impurities easily damage the temperature sensor and reduce the sensitivity of the sensor, thereby reducing the operational precision of the temperature sensor.

3. The separately mounted MAP and temperature sensors increase the numbers of parts of the sensors, thus lengthening the processing time, reducing productivity and increasing the production cost.

DISCLOSURE OF THE INVENTION

Accordingly, the present invention has been made keeping in mind the above problems occurring in the prior art, and an object of the present invention is to provide a pressure and temperature sensor assembly for internal combustion engines, which is commonly used as a conventional MAP sensor and a conventional temperature sensor for such engines, thus reducing the number of sensing parts in such an engine, simplifying the sensor manufacturing process, improving productivity, reducing the production cost, simplifying the construction of the sensor, reducing the damaged area of the temperature sensor caused by impurities of inlet air, and effectively accomplishing the operational precision of the sensors.

In order to accomplish the above object, the present invention provides a pressure and temperature sensor assembly for internal combustion engines, comprising a pressure sensor member having a pressure inlet pipe on its bottom center, a circuit board electrically connected to the sensor member, a housing receiving both the sensor member and the circuit board therein and being formed by integrating top and bottom cases into a single structure, the top case being integrated with a connector having a plurality of connection pins, and the bottom case being provided with a pressure inlet port being concentric with the pressure inlet pipe of the sensor member, wherein the bottom case is partially protruded downward at a portion around the pressure inlet port, thus having a temperature sensing rod extending downwardly from the lower edge of the pressure inlet port to a predetermined length, with a temperature sensor chip being interiorly installed in the temperature sensing rod and being electrically connected to the connection terminals of the connector.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an exploded sectioned view showing the construction of a pressure and temperature sensor assembly for internal combustion engines in accordance with the preferred embodiment of the present invention; and FIG. 2 is a partially broken sectioned view of the sensor assembly of FIG. 1, with the parts of the sensor assembly being assembled into a single structure.

BEST MODE FOR CARRYING OUT THE INVENTION

FIG. 1 is an exploded sectioned view showing the construction of a pressure and temperature sensor assembly for internal combustion engines in accordance with the preferred embodiment of the present invention. FIG. 2 is a partially broken sectioned view of the sensor assembly of FIG. 1, with the parts of the sensor assembly being assembled into a single structure.

As shown in the drawings, the housing of the pressure and temperature sensor assembly of this invention is comprised of two parts, that is, top and bottom cases 1 and 7 which are integrated into a single structure. Integrated with the top case 1 at one side of the case 1 is a connector 3, which is provided with a plurality of connection pins 2. The top case 1, with the connector 3, defines an internal cavity 6 for receiving both a sensor member 4 and a circuit board 5 therein. Meanwhile, the bottom case 7, which is integrated with the top case 1 into a single structure, is provided with a pressure inlet port 9 on its bottom. Fitted over the outside wall of the bottom case 7 is an O-ring 10. The circuit board 5 is positioned under the sensor member 4 and is electrically connected to the member 4. A pressure inlet pipe 4' of the sensor member 4, which is concentric with the pressure inlet port 9 of the bottom case 7, passes downwardly through the center opening of the circuit board 5.

In order to assembly the pressure and temperature sensor parts into a single structure, a terminal mount area 20 is provided on a bottom side of the top case 1 for mounting a temperature sensing pin terminal 21 to the top case 1. The pin terminal 21 is connected to the connection pins 2 of the connector 3. On the other hand, the bottom case 7 is partially protruded downward at a portion around the pressure inlet port 9, thus having a temperature sensing rod 23 which extends downwardly from the edge 8 of the enlarged lower part of the pressure inlet port 9 to a predetermined length. A temperature sensor chip 24 is interiorly installed in the lower part of the sensing rod 23. The above temperature sensor chip 24 is electrically connected to a side connection terminal 25, which is fixed onto the side of the bottom case 7 at the top end of the case 7. The side connection terminal 25 is brought into contact with the temperature sensing pin terminal 21 when the top and bottom cases 1 and 7 are assembled into a single structure. Therefore, the temperature sensor chip 24 in the sensing rod 23 is electrically connected to the connection terminals 2 of the connector 3.

In the drawings, the reference numeral 30 denotes an O-ring which is fitted over the pressure inlet pipe 4' of the sensor body 4. Meanwhile, the numeral 31 denotes an annular support for holding the O-ring 30 on its place in the pressure inlet port 9 of the bottom case 7.

The operational effect of the above MAP sensor will be described hereinbelow.

The sensor assembly of FIG. 2 is installed in an internal combustion engine so as to be connected to a surge tank (not shown) of the engine, with the edge 8 of the bottom case 7 being exposed into the surge tank. Therefore, the pressure in the surge tank is allowed to be guided onto the sensor body 4 through the pressure inlet port 9 prior to sensing the pressure of the surge tank. The temperature of air, passing through the surge tank, is sensed by the temperature sensor chip 24 of the sensing rod 23. Therefore, the sensor assembly of this invention is commonly used as a conventional MAP sensor, which senses the internal pressure of a cylinder so as to auxiliarily control the suction timing of mixed gas into the cylinder, and as a conventional temperature sensor, which senses the inlet air temperature so as to allow an electronic control unit for the engine to calculate an appropriate amount of air for the engine in accordance with a density variation of air caused by variable temperature. The above-mentioned two operational functions of the sensor assembly of this invention are equal to those of the conventional MAP and temperature sensors for internal combustion engines.

Industrial Applicability

As described above, the present invention provides a pressure and temperature sensor assembly for internal combustion engines, which is formed by integrating a temperature sensor part with a conventional MAP sensor into a single structure. The sensor assembly of this invention is thus commonly used for sensing both the internal pressure and inlet air temperature of a cylinder. Therefore, the sensor assembly reduces the number of sensing parts in an engine, simplifies the sensor manufacturing process, improves productivity, and reduces the production cost, thereby increasing market competitiveness of the sensors. In the sensor assembly of this invention, the pressure and temperatures sensor parts are mounted onto the same position in an engine, thus simplifying the construction of the engine and being easily installed in the engine and improving work efficiency while being installed in the engine. In addition, the temperature sensing rod of this sensor assembly is not installed in an intake tube (not shown) but is installed in a surge tank unlike a prior art temperature sensor. The inlet air is filtered by an air cleaner prior to being introduced into the surge tank and so the surge tank is almost completely free from any impurities such as moisture, dust and powdered rock in the inlet air. The temperature sensing rod of this sensor assembly is free from such impurities and effectively maintains its clear surface, thus maintaining its sensitivity and performing a precise sensing operation for a lengthy period of time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pressure and temperature sensor assembly for internal combustion engines, comprising a pressure sensor member having a pressure inlet pipe on a bottom center thereof, a circuit board electrically connected to said sensor member, a housing receiving both the sensor member and the circuit board therein and being formed by integrating a top case and a bottom case into a single structure, said top case being integrated with a connector including a plurality of connection terminals, and said bottom case being provided with a pressure inlet port being concentric with the pressure inlet pipe of the sensor member, wherein said bottom case is partially protruded downward at a portion around said pressure inlet port, thus including a temperature sensing rod extending downwardly from a lower edge of said pressure inlet port to a predetermined length, with a temperature sensor chip being interiorly installed in said temperature sensing rod and being electrically connected to said connection terminals of the connector;

wherein said temperature sensor chip is electrically connected to said connection terminals of the connector by electric connection means, said electric connection means comprising:

a temperature sensing pin terminal mounted to a lower surface of said top case and electrically connected to said connection terminals of the connector; and a side connection terminal extending from a top side of said bottom case to a predetermined length, said side connection terminal being connected to the temperature sensor chip and being brought into contact with said temperature sensing pin terminal, thus electrically connecting the temperature sensor chip to the connection terminals of the connector through the temperature sensing pin terminal.

2. The pressure and temperature sensor assembly according to claim 1, wherein said temperature sensor chip is electrically connected to said connection terminals of the connector by electric connection means, said electric connection means comprising:

a temperature sensing pin terminal mounted to the lower surface of said top case and electrically connected to said connection terminals of the connector; and a side connection terminal extending from a top side of said bottom case to a predetermined length, said side connection terminal being connected to the temperature sensor chip and being brought into contact with said temperature sensing pin terminal, thus electrically connecting the temperature sensor chip to the connection terminals of the connector through the temperature sensing pin terminal.

3. The pressure and temperature sensor assembly according to claim 1, wherein said circuit board is positioned under the pressure sensor member.

* * * * *